US010947664B2

(12) United States Patent
Martin et al.

(10) Patent No.: US 10,947,664 B2
(45) Date of Patent: Mar. 16, 2021

(54) METAL DETECTABLE SCOURING PAD

(71) Applicants: Illinois Tool Works Inc., Glenview, IL (US); ABRAX Srl, di Viadana (IT)

(72) Inventors: Robert Martin, Glenview, IL (US); Mario Di Benedetto, di Viadana (IT)

(73) Assignee: ILLINOIS TOOL WORKS INC., Glenview, IL (US)

( * ) Notice: Subject to any disclaimer, the term of this patent is extended or adjusted under 35 U.S.C. 154(b) by 59 days.

(21) Appl. No.: 16/274,977

(22) Filed: Feb. 13, 2019

(65) Prior Publication Data
US 2019/0257028 A1 Aug. 22, 2019

Related U.S. Application Data

(60) Provisional application No. 62/632,087, filed on Feb. 19, 2018.

(51) Int. Cl.
*D06M 11/49* (2006.01)
*A47L 17/08* (2006.01)
(Continued)

(52) U.S. Cl.
CPC ............. *D06M 11/49* (2013.01); *A47L 13/16* (2013.01); *A47L 17/08* (2013.01); *B08B 1/001* (2013.01);
(Continued)

(58) Field of Classification Search
CPC .............. G01V 3/081; D06M 2101/20; D06M 2101/34; D06M 2101/06
See application file for complete search history.

(56) References Cited

U.S. PATENT DOCUMENTS 3,068,547 A 12/1962 L'Hommedieu
3,491,802 A 1/1970 Mortensen et al.
(Continued)

FOREIGN PATENT DOCUMENTS

CN 101597811 A 12/2009
CN 101671864 A 3/2010
(Continued)

OTHER PUBLICATIONS

International Search Report dated Oct. 2, 2015 for International Application No. PCT/US2015/041461 filed Jul. 22, 2015.
(Continued)

*Primary Examiner* — Dominic E Hawkins
(74) *Attorney, Agent, or Firm* — Blue Filament Law PLLC

(57) ABSTRACT

A detectable scouring pad is provided that is made with a sparse unwoven base polymer that defines the pad shape, an overcoating of cured thermoset resin loaded with a particulate on the base polymer, the particulate present in an amount to render the polymer detectable by X-ray detection or magnetometer detection. A process of detecting a scouring pad includes forming a fiber composed of a base polymer having a cross-section and a length, and distributing a particulate on the thermoplastic polymer in a thermoset resin matrix. The process further includes forming a sparse unwoven thermoplastic polymer from the fiber, and manufacturing the scouring pad from the sparse unwoven polymer by overcoating the base polymer with a particulate loaded thermoset resin. The scouring pad is passed through an X-ray detector or a magnetometer detector, and a signal is collected from the detector indicative of the presence of the scouring pad.

30 Claims, 5 Drawing Sheets

(51) Int. Cl.

| | | |
|---|---|---|
| *B08B 1/00* | (2006.01) | |
| *D06H 3/10* | (2006.01) | |
| *D06M 23/08* | (2006.01) | |
| *G01V 3/08* | (2006.01) | |
| *G01V 5/00* | (2006.01) | |
| *D06M 15/55* | (2006.01) | |
| *D06M 15/263* | (2006.01) | |
| *D06M 10/00* | (2006.01) | |
| *D06M 11/36* | (2006.01) | |
| *A47L 13/16* | (2006.01) | |
| *D06M 15/564* | (2006.01) | |
| *D06M 15/507* | (2006.01) | |
| *D06M 11/58* | (2006.01) | |
| *D06M 101/20* | (2006.01) | |
| *D06M 101/34* | (2006.01) | |
| *D06M 101/06* | (2006.01) | |

(52) U.S. Cl.
CPC ............ *D06H 3/10* (2013.01); *D06M 10/001* (2013.01); *D06M 11/36* (2013.01); *D06M 11/58* (2013.01); *D06M 15/263* (2013.01); *D06M 15/507* (2013.01); *D06M 15/55* (2013.01); *D06M 15/564* (2013.01); *D06M 23/08* (2013.01); *G01V 3/081* (2013.01); *G01V 5/00* (2013.01); *D06M 2101/06* (2013.01); *D06M 2101/20* (2013.01); *D06M 2101/34* (2013.01); *D06M 2200/00* (2013.01); *D10B 2505/00* (2013.01)

(56) References Cited

U.S. PATENT DOCUMENTS

| | | |
|---|---|---|
| 3,620,875 A | 11/1971 | Guglielmo, Sr. et al. |
| 3,633,533 A | 1/1972 | Allen et al. |
| 3,701,165 A | 10/1972 | Huddleston |
| 3,756,241 A | 9/1973 | Patience |
| 3,756,512 A | 9/1973 | Dyal |
| 3,867,935 A | 2/1975 | Eisdorfer et al. |
| 3,911,922 A | 10/1975 | Kliger |
| 3,929,659 A | 12/1975 | Graham |
| 4,068,666 A | 1/1978 | Shiff |
| 4,155,487 A | 5/1979 | Blake |
| 4,185,626 A | 1/1980 | Jones et al. |
| 4,345,718 A | 8/1982 | Horvath |
| 4,620,646 A | 11/1986 | Crapser |
| 4,620,656 A | 11/1986 | McClay et al. |
| 4,645,499 A | 2/1987 | Rupinskas |
| 4,664,971 A | 5/1987 | Soens |
| 4,692,380 A | 9/1987 | Reid |
| 4,718,897 A | 1/1988 | Elves |
| 4,935,019 A | 6/1990 | Papp, Jr. |
| 4,938,901 A | 7/1990 | Groitzsch et al. |
| 5,045,080 A | 9/1991 | Dyer et al. |
| 5,112,325 A | 5/1992 | Zachry |
| 5,178,354 A | 1/1993 | Engvall |
| 5,183,614 A | 2/1993 | Champion |
| 5,204,162 A | 4/1993 | Ketcham |
| 5,337,912 A | 8/1994 | Jochem |
| 5,379,924 A | 1/1995 | Taylor |
| 5,425,996 A | 6/1995 | Wilkie et al. |
| 5,522,921 A | 6/1996 | Custer |
| 5,670,239 A | 9/1997 | Hampp |
| 5,793,214 A | 8/1998 | Wakamatsu |
| 5,888,640 A | 3/1999 | Marotta et al. |
| 5,897,673 A | 4/1999 | Nishida et al. |
| 5,931,824 A | 8/1999 | Stewart et al. |
| 5,952,099 A | 9/1999 | Asher et al. |
| 6,177,113 B1 | 1/2001 | Kress et al. |
| 6,200,628 B1 | 3/2001 | Rozumek et al. |
| 6,332,993 B1 | 12/2001 | Jen |
| 6,356,782 B1 | 3/2002 | Sirimanne et al. |
| 6,371,904 B1 | 4/2002 | Sirimanne et al. |
| 6,395,147 B1 | 5/2002 | Wheat et al. |
| 6,502,726 B1 | 1/2003 | Yquel |
| D487,353 S | 3/2004 | Wolf |
| 6,825,249 B1 | 11/2004 | Takeda et al. |
| 6,896,759 B2 | 5/2005 | Fujisawa et al. |
| 7,015,156 B2 * | 3/2006 | Maldonado ............ A47K 7/03 15/208 |
| 7,038,766 B2 | 5/2006 | Kerns et al. |
| 7,044,957 B2 | 5/2006 | Foerster et al. |
| 7,053,013 B1 | 5/2006 | Nosov et al. |
| 7,222,727 B2 | 5/2007 | Aisenbrey |
| 7,229,417 B2 | 6/2007 | Foerster et al. |
| 7,242,176 B2 | 7/2007 | Thomason |
| 7,465,847 B2 | 12/2008 | Fabian |
| 7,568,590 B1 | 8/2009 | Gross et al. |
| 7,625,397 B2 | 12/2009 | Foerster et al. |
| 7,631,767 B2 | 12/2009 | May et al. |
| 7,668,582 B2 | 2/2010 | Sirimanne et al. |
| 7,703,674 B2 | 4/2010 | Stewart et al. |
| 7,795,491 B2 | 9/2010 | Stewart et al. |
| 7,952,375 B2 | 5/2011 | Eldridge et al. |
| 8,075,985 B2 | 12/2011 | Lee et al. |
| 8,093,161 B2 | 1/2012 | Bansal et al. |
| 8,267,681 B2 | 9/2012 | Gupta et al. |
| 8,410,006 B2 | 4/2013 | Chappas et al. |
| 8,980,982 B2 | 3/2015 | Martin et al. |
| 9,303,342 B2 | 4/2016 | Wang et al. |
| 2004/0031798 A1 | 2/2004 | Fox et al. |
| 2004/0142495 A1 | 7/2004 | Hartman et al. |
| 2005/0153857 A1 | 7/2005 | Sherry et al. |
| 2005/0236407 A1 | 10/2005 | Aisenbrey |
| 2007/0003761 A1 | 1/2007 | Miyazono et al. |
| 2007/0205529 A1 | 9/2007 | May et al. |
| 2007/0219516 A1 | 9/2007 | Patel et al. |
| 2007/0221247 A1 * | 9/2007 | Duda ...................... A47L 13/16 134/6 |
| 2008/0286596 A1 * | 11/2008 | Soep .................... B32B 37/156 428/549 |
| 2008/0290649 A1 | 11/2008 | Klein et al. |
| 2010/0087731 A1 | 4/2010 | Ramachandran |
| 2010/0124644 A1 | 5/2010 | Hein et al. |
| 2010/0187171 A1 | 7/2010 | Gupta |
| 2010/0187712 A1 | 7/2010 | Gupta et al. |
| 2010/0221969 A1 | 9/2010 | Chen et al. |
| 2010/0247371 A1 | 9/2010 | Farrugia et al. |
| 2011/0277261 A1 * | 11/2011 | Hasket .................. B24D 13/12 15/229.12 |
| 2012/0000691 A1 | 1/2012 | Shah et al. |
| 2012/0164907 A1 | 6/2012 | Restuccia et al. |
| 2012/0289107 A1 | 11/2012 | Beissinger et al. |
| 2015/0132574 A1 | 5/2015 | Aldridge et al. |
| 2015/0183090 A1 | 7/2015 | Hsu et al. |
| 2016/0024699 A1 | 1/2016 | Aldridge et al. |
| 2017/0051442 A1 * | 2/2017 | Endle ..................... A47L 13/16 |
| 2017/0074829 A1 * | 3/2017 | Mertins .................. B32B 5/028 |
| 2019/0133403 A1 * | 5/2019 | Gorrell .................. A47L 13/16 |

FOREIGN PATENT DOCUMENTS

| | | |
|---|---|---|
| EP | 0160560 A2 | 11/1985 |
| EP | 0942804 A1 | 9/1999 |
| EP | 1217105 A1 | 6/2002 |
| EP | 1650556 A1 | 4/2006 |
| EP | 1776006 A1 | 4/2007 |
| GB | 2315698 A | 2/1998 |
| GB | 2372934 A | 9/2002 |
| JP | H0931749 A | 2/1997 |
| JP | 2002020554 A | 1/2002 |
| JP | 2005009024 A | 1/2005 |
| JP | 2008303525 A | 12/2008 |
| JP | 2014095170 A | 5/2014 |
| KR | 890001835 B1 | 5/1989 |
| KR | 20010086868 A | 9/2001 |
| KR | 20020050902 A | 6/2002 |
| WO | 9305101 A1 | 3/1993 |
| WO | 0023275 A1 | 4/2000 |
| WO | 2004094763 A2 | 11/2004 |
| WO | 2005061649 A1 | 7/2005 |

(56) References Cited

FOREIGN PATENT DOCUMENTS

| WO | 2006026823 A1 | 3/2006 |
| WO | 2007012898 A1 | 2/2007 |
| WO | 2008146529 A1 | 12/2008 |
| WO | 2017048897 A1 | 3/2017 |

OTHER PUBLICATIONS

Written Opinion of the International Searching Authority dated Oct. 2, 2015 for International Application No. PCT/US2015/041461 filed Jul. 22, 2015.
International Search Report dated May 17, 2019 for International Application No. PCT/US2019/018013 filed Feb. 14, 2019.
Dong, W. et al., "Novel fabrication of magnetic thermoplastic nanofibers via melt extrusion of immiscible blends", Polymers Advanced Technologies, 2012, 5 pages, © 2012 John Wiley & Sons, Ltd.; DOI: 10.1002/pat.3051.
Niu, S. et al., "Fabrication of magnetic nanofibers via surface-initiated RAFT polymerization and coaxial electrospinning", Reactive & Functional Polymers, 2013 (Published online: Aug. 3, 2013), pp. 1447-1454, vol. 73, © 2013 Elsevier Ltd.; DOI: 10.1016/j.reactfunctpolym.2013.07.011.
International Search Report dated Jan. 9, 2015 for International Application No. PCT/US2014/061466 filed Oct. 21, 2014.
International Search Report dated Nov. 28, 2016 for International Application No. PCT/US2016/051836 filed Sep. 15, 2016.
International Search Report dated Jun. 27, 2012 for International Application No. PCT/US2012/030249 filed Mar. 23, 2012.
European Search Report dated Jan. 27, 2017 for European Application No. 16188423 filed Mar. 23, 2012.

\* cited by examiner

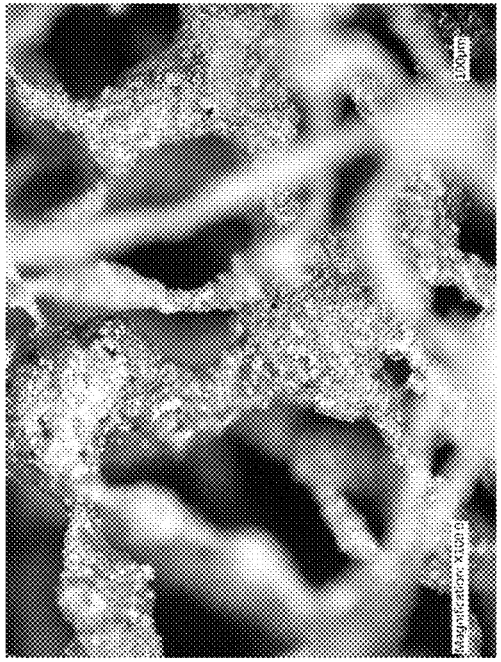
FIG. 1B - Sample 1
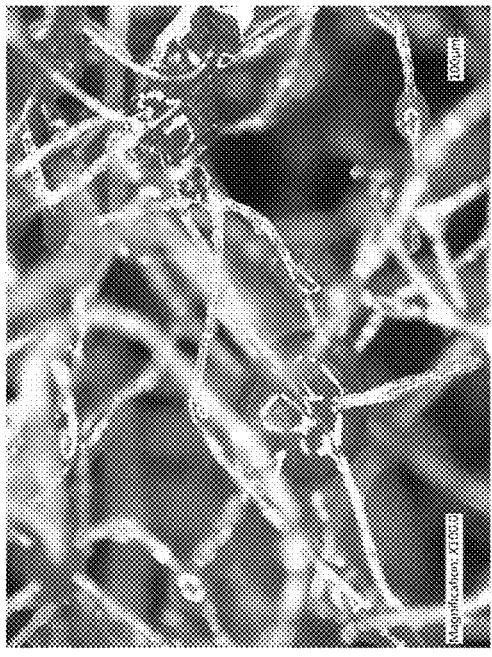
FIG. 1D – Sample 3
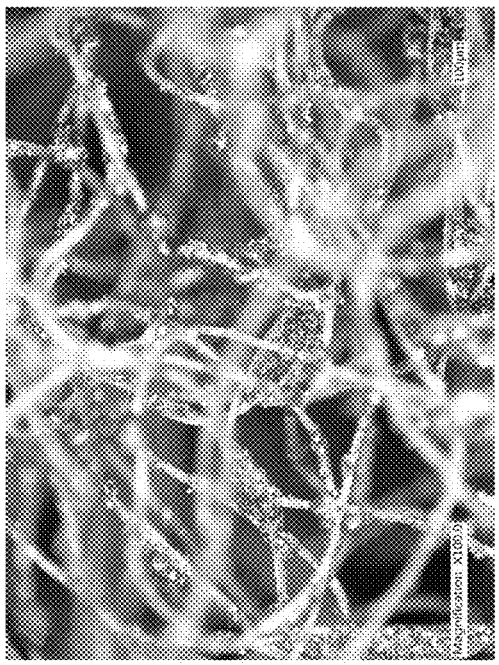
FIG. 1A
(Prior Art)
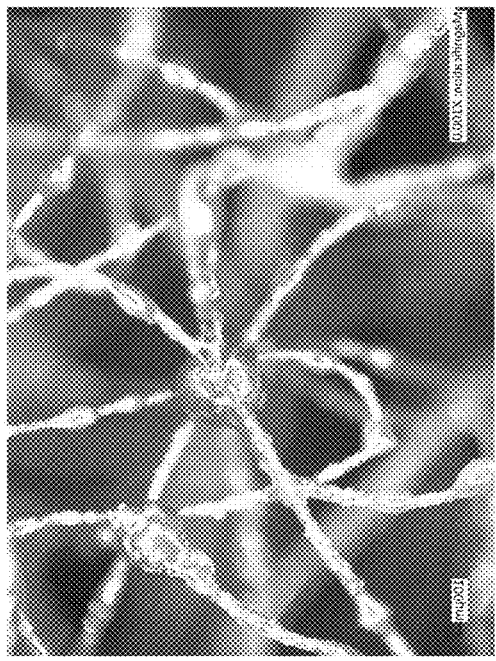
FIG. 1C – Sample 2

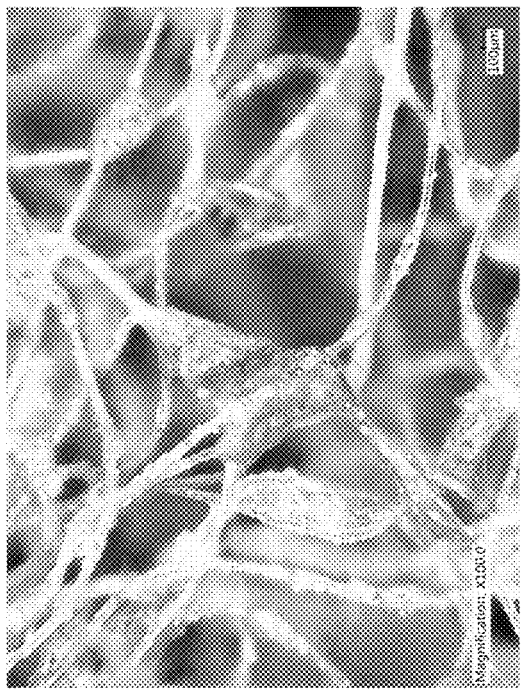
FIG. 1F – Sample 4
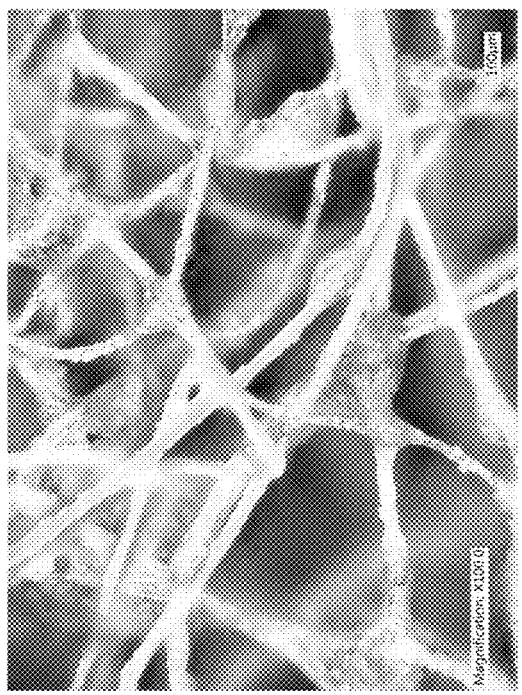
FIG. 1E – Sample 4

METAL DETECTABLE SCOURING PAD

CROSS REFERENCE TO RELATED APPLICATIONS

This application claims priority benefit of U.S. Provisional Application Ser. No. 62/632,087 filed 19 Feb. 2018; the contents of which are hereby incorporated by reference.

FIELD OF THE INVENTION

The present invention relates to the technical field of polymeric composite fibers, and in particular to polymeric fibers with high loadings of metal particulate that renders scouring pads formed from such fibers X-ray or magnetometer detectable.

BACKGROUND OF THE INVENTION

Many industries have a need for metal detectable polymers and articles made therefrom. By way of example, a food, medical, or pharmaceutical production line maintains tight audit control of service items that enter the manufacturing facility to assure such items do not accidently enter the production stream as a contaminant that can be fragmented into dangerous shards. Historically, plastics have been precluded from some environments due to the inability to locate such articles with product screening X-ray detectors or magnetometers. Recently, plastic articles have been developed that are filled with metal particulate or electron dense inorganics, as detailed in U.S. Pat. No. 8,980,982 that are detectable with a magnetometer or X-ray detector, yet still process as injection moldable thermoplastics and operate in a manner similar to their unfilled conventional counterparts. U.S. Pat. No. 5,897,673 teaches fibers containing fine metallic particles that are cross-linked to the polymeric fiber. Co-pending patent application Ser. No. 14/496,818 filed Sep. 25, 2014 and Ser. No. 14/705,565 filed May 6, 2015 both teach polymeric fibers with high loadings of metal particulate that render articles formed from such fibers X-ray or magnetic detectable.

A scouring pad is a small pad of metal or plastic mesh used for scouring a surface. Some scouring pads have one side made of a soft sponge-like material and the other is the aforementioned mesh. Toroidal metal scouring pads have fallen into disfavor, as it removes non-stick surfaces off pans and is otherwise often too abrasive.

Conventional abrasive products that include cleaning pads and tools for home uses such as dish washing and scouring, as well as various types of surfaces for industrial applications, such as discs, belts, and rotating brushes, with varying compositions and levels of hardness are routinely purchased for consumer and commercial applications. By way of example, conventional souring pads have a structure formed with a sparse unwoven polymer such as cellulose, nylon, or spun polypropylene fiber. Products use several variations of abrasive materials, such as alumina, and titania in a thermoset resin. Although the base polymer fibers are too soft to provide scouring functionality, the overcoat of grit in a comparative rigid thermoset matrix greatly enhances the abrasive powers to the extent that a heavy-duty souring pad will actually scratch glass.

While there have been many advancements in scouring pads, these pads are not useable in the aforementioned production environments due to the lack of detectable features that act to assure the pads do not accidently enter the production stream as a contaminant.

Thus, there exists a need for an X-ray or magnetometer detectable scouring pad. There also exists a need for such a pad to be detectable with conventional detection equipment in a production environment. There also exists a need for such fibers that process and retain properties of conventional thermoplastic fibers to promote production of various scouring pads from fibers that have the added benefit of being X-ray or magnetically detectable while operating in a manner similar to conventional scouring pads.

SUMMARY OF THE INVENTION

A detectable scouring pad is provided that is made with a sparse unwoven base polymer that defines the pad shape, an overcoating of cured thermoset resin loaded with a particulate on the base polymer, the particulate present in an amount to render the polymer detectable by X-ray detection or magnetometer detection.

A process of detecting a scouring pad includes forming a fiber composed of a base polymer having a cross-section and a length, and distributing a particulate on the thermoplastic polymer in a thermoset resin matrix. The process further includes forming a sparse unwoven thermoplastic polymer from the fiber, and manufacturing the scouring pad from the sparse unwoven polymer by overcoating the base polymer with a particulate loaded thermoset resin. The scouring pad is passed through an X-ray detector or a magnetometer detector, and a signal is collected from the X-ray detector or the magnetometer detector indicative of the presence of the scouring pad.

BRIEF DESCRIPTION OF THE DRAWINGS

The present invention is further detailed with respect to the following figures that depict various aspects of the present invention.

FIG. 1A is a transmission optical micrograph of a prior art SCOTCH-BRITE® pad;

FIGS. 1B-1F are transmission optical micrograph of samples of the inventive materials with varying metal loadings for use in a detectable scouring pad;

DETAILED DESCRIPTION OF THE PREFERRED EMBODIMENTS

Figure 2:
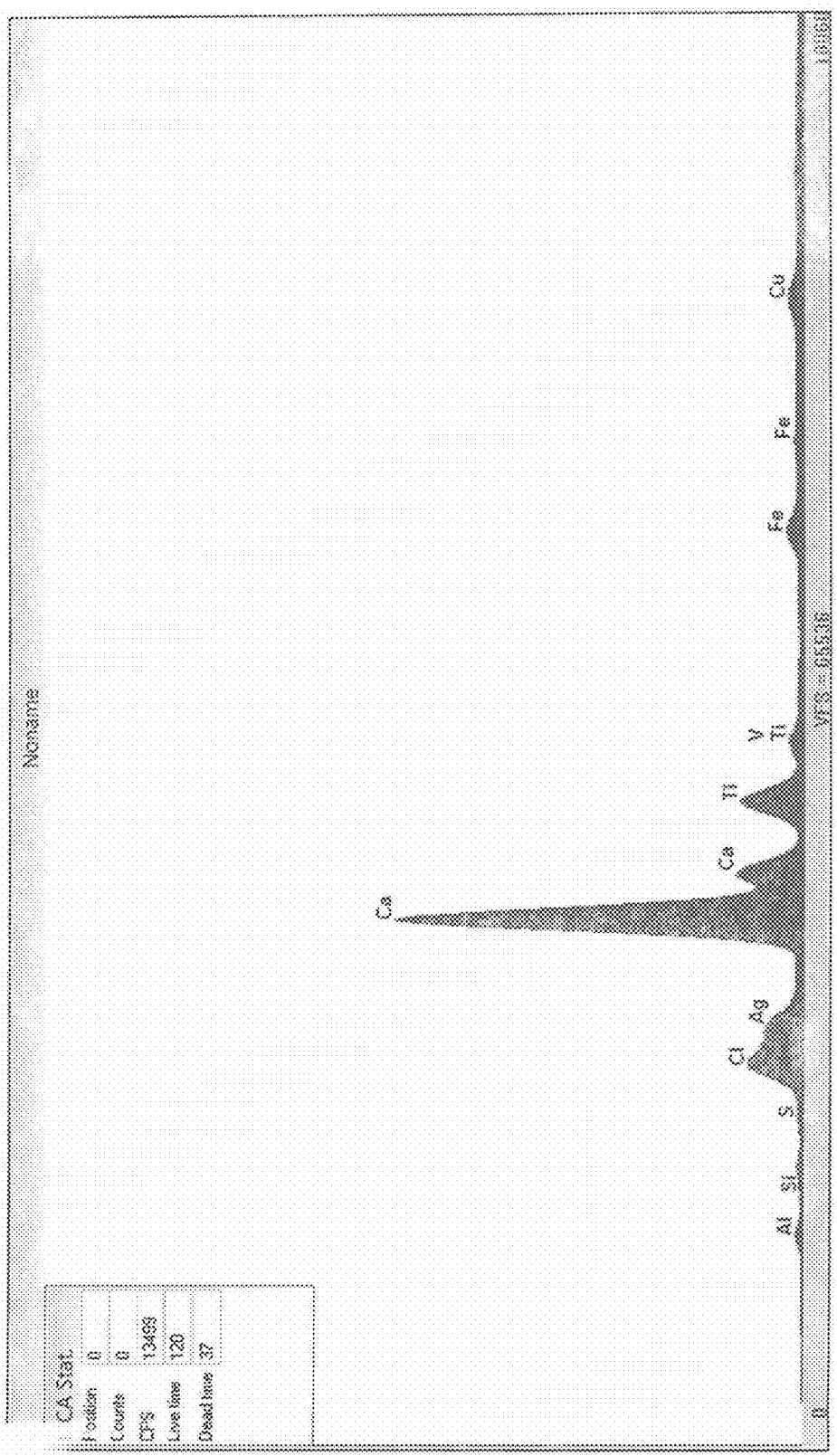
FIG. 2 is an X-ray fluorescence spectral analysis of a prior art SCOTCH-BRITE® pad.

The present invention has utility as a detectable scouring pad formed with metal loaded fibers that are electromagnetic spectrally detectable, and the scouring pad is suitable for usage in a variety of fields including food production, medical, and pharmaceutical production environments.

As used herein, the term "fiber" defines both fibers of finite length, such as conventional preselected length fiber, as well as substantially continuous structures, such as continuous filaments, unless otherwise indicated. The fibers of the present invention are appreciated to be hollow or solid fibers, and further can have a substantially round or circular cross-section or cross-sections of different symmetry space groups with other cross-sections illustratively including oval; lobular; polygonal such as triangular, square, rectangular, trapezoidal, pentagonal, and hexagonal. A fiber of the present invention in some embodiments has a sheath that varies in polymer or particulate, with the variation being as to composition or concentration, or both such properties.

As used herein, the term "sparse" is related to a fiber density of between 2 and 70 percent of a given volume defined by a pad.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

It is appreciated that both the cross-sectional shape of the fiber and the configuration of the particulate and other components therein depends upon the equipment that is used in the preparation of the fiber, the process conditions, and the melt viscosities of the various components. A wide variety of fiber configurations are readily produced according to the present invention to achieve loadings sufficient for magnetometer or X-ray detection. Generally, as illustrated in the figures, a fiber of the invention is a single or multi-component composite fiber formed from a melt of one or more polymeric materials loaded with one or more metallic materials as specified below.

Embodiments of the inventive detectable scouring pad may be formed with a sparse unwoven base polymer illustratively including cellulose, nylon, or spun polypropylene fiber. The polymeric component of an inventive fiber is readily selected from any of the types of polymers known in the art that are capable of being formed into fibers, including polyolefins, polyvinyl, polyvinyl alcohol, polyesters, polyamides, co-polymers containing any of the aforementioned polymers as blocks of a copolymer, and combinations thereof. Specific polyolefins operative herein illustratively include polypropylene; polyethylene; polybutene; and polyisobutylene; polyamides illustratively including nylon 6 and nylon 6,6; polyacrylates; polystyrenes; polyurethanes; acetal resins; polyethylene vinyl alcohol; polyesters such as polyethylene terephthalate (PET), polyethylene naphthalate, polytrimethylene terephthalate, poly(1,4-cyclohexylene dimethylene terephthalate) (PCT), polycarbonates; and aliphatic polyesters such as polylactic acid (PLA); polyphenylene sulfide; thermoplastic elastomers; polyacrylonitrile; cellulose and cellulose derivatives; polyaramids; acetals; fluoropolymers; copolymers and terpolymers thereof and mixtures or blends thereof, and without regard as whether a given polyolefin is syndiotacic, eutectic, isotactic, or atactic.

Specific examples of aliphatic polyesters operative in the present invention include fiber forming base polymers formed from a combination of an aliphatic glycol such as ethylene glycol, propylene glycol, butylene glycol, hexanediol, octanediol or decanediol) or an oligomer of ethylene glycol (e.g., diethylene glycol or triethylene glycol) with an aliphatic dicarboxylic acid such as succinic acid, adipic acid, hexanedicarboxylic acid or decaneolicarboxylic acid); or the self-condensation of hydroxy carboxylic acids other than poly(lactic acid), such as polyhydroxy butyrate, polyethylene adipate, polybutylene adipate, polyhexane adipate, and copolymers containing the same. Aromatic polyesters operative in the present invention include fiber forming polymers formed from polyesters of alkylene glycols having 2-10 carbon atoms and aromatic diacids; polyalkylene naphthalates, which are polyesters of 2,6-naphthalenedicarboxylic acid and alkylene glycols, as for example polyethylene naphthalate; or polyesters derived from 1,4-cyclohexanedimethanol and terephthalic acid, as for example polycyclohexane terephthalate. Exemplary polyalkylene terephthalates include polyethylene terephthalate (also PET) and polybutylene terephthalate.

The sparse unwoven base polymer is overcoated with a curable thermoset resin containing the magnetic or X-ray signal detectable particulate in amounts in excess of that found in conventional scouring pads and of a different composition. The particulate being suspended in the uncured thermoset resin. Thermoset resins operative herein include those that are crosslinked by thermal, radiation, or free-radical or acid chemical reactions and herein illustratively poly(meth)acrylates, polyesters, epoxies, polyurethanes, and polyureas and subject to the proviso that the thermoset resin, curatives therefor, and carrier solvents therefor are chemically compatible with the base polymer fiber. In particular inventive embodiments the thermoset resin is water based acrylic and phenolics. The thermoset resin loaded with particulate is applied by conventional techniques to form an overcoat. These techniques illustratively include dip coating, spray coating, roller coating, or brush coating.

Embodiments of the detectable scouring pad that are complaint with food, medical and pharmaceutical processing standards, have particulate compositions of particulate to render the pad magnetic or X-ray signal detectable may include iron, bronze, brass, steel, barium salts, cobalt, titanium, tin, copper, tungsten, platinum, silver, bismuth, zinc, lead, molybdenum, neodymium, samarium, alloys of any of the aforementioned, oxides of any of the aforementioned metals, nitrides of any of the aforementioned. It is appreciated that cobalt alloys such as cobalt-samarium, and neodymium alloys have exceptionally high magnetic moments that allow for magnetic detection at lower weight loading compared for ferrite. While the loading of particulate required for detection is dependent on factors that include detection technique, the X-ray cross-section or the magnetic susceptibility of a given particulate, transit speed of a pad through a detector, identity of the particulate, and pad thickness, typical loadings of the aforementioned particulate range from 30 to 85 total weight percent of the pad. In those instances when the particulate is iron oxide loading in some inventive embodiments are between 37 and 80 total weight percent. It is appreciated that excessive loading of particulate caused the overcoating to crack by propagation from particle to particle thereby leading to an overcoating that is too brittle. By way of comparison, a conventional non-detectable scouring pad contain 30 to 45 total weight percent of calcium carbonate particulate, as measured by combustion weight loss.

A thickness of resin overcoating is selected to contain the required amount of particulate. Typical thicknesses of a resin overcoating range from 10 to 200 percent of the bases fiber cross-sectional diameter.

In certain embodiments, each of the polymeric components of an inventive fiber includes other substances known conventionally to modify a processing property or performance property. Such additive substances illustratively include antioxidants, stabilizers, surfactants, waxes, flow promoters, solid solvents, dyes, pigments, plasticizers and combinations thereof. It is appreciated that a pigment can encompass a composition of a particulate material detailed above to impart detectability to the inventive fiber and in such instances the pigment is compositionally distinct from the particulate and present in a lower weight percentage than the particulate.

In order to manufacture the present invention, particles are compounded with one or more suitable curable thermoset resins, as defined above that will form the overcoating on the basic fiber structure. The overcoating is then applied onto the base fiber structure and allowed to cure. The base fibers that define a pad structure typically have fiber diameters between 0.1 and 500 microns in diameter, and the overcoating is applied to a thickness as noted above to render the result pad detectable. In some inventive embodiments the thermoset resin in selected to have a greater stiffness than the underlying base fiber when normalized to thickness to impart a greater stiffness to the resulting scouring pad and as a result, the amount of manual force that must be applied to given target deposit is reduced, compared to an unstiffened pad.

An inventive nonwoven pad in some inventive embodiments is bonded using bonding techniques known in the industry. Exemplary bonding techniques for nonwoven webs include mechanical bonding, such as hydro-entanglement and needle punching, adhesive bonding, thermal bonding, and the like. An example of thermal bonding is through air bonding, although other thermal bonding techniques, such as calendaring, microwave or other radio frequency (RF) treatments are readily employed. As a result, an inventive pad is readily bonded to various substrates that illustratively include woven fabrics, nonwoven fabrics, thermoplastic films, polymeric sponges, and metal wools; the aforementioned fabrics and films are readily formed of a variety of materials that include thermoplastics, cellulosics, metals, and combinations thereof.

Scouring pads formed according to the present invention from such particulate loaded fibers retain the operational properties of non-particulate loaded pads formed of the same polymer compositions, with the added attribute of being detectable with conventional food, medical and pharmaceutical production magnetic or X-ray detectors.

Modern metal detection is based on creating a magnetic field with a transmitter coil and two receiving coils wired in reverse. The resulting field is interrupted when a conductive or magnetic contaminant passes through the field. The contaminant is detected by measuring the change in voltage above the change in voltage of non-contaminated product. If a contaminant is detected, that product is rejected. Contaminants are generally categorized as sphere equivalents in millimeters. The sensitivity and throughput are machine dependent.

X-ray inspection is based on density. The higher the density of the object being examined, the more energy is absorbed. X-ray detection measures how much energy is absorbed by a product or contaminant. X-ray detection can detect contaminants such as glass or bone that a metal detector will not detect. X-ray detection can perform other quality functions outside the scope of product contamination. The present invention focuses on contaminant detection. The contaminants are generally categorized as sphere equivalents. The sensitivity and throughput are machine dependent.

The following examples are specific non-limiting examples of present invention. These examples should not be considered to be a limit on the scope of the appended claims.

EXAMPLES

Example 1

Ash testing was conducted on the three samples (Sample 1, Sample 2, Sample 3) of the inventive detectable scouring pad as shown in FIGS. 1B-1D, respectively to determine the metal loading of the samples with respect to the degree of metal detector readings. FIGS. 1E and 1F are micrographs of a fourth inventive detectable scouring pad varying in the amount of metal loading compared to Samples 1-3. As a comparative example, a commercial available convention pad sample as shown in FIG. 1A was also tested for detectability and for metal loading content. Table 2 summarizes the results. As may be seen from the table, Sample 1 with the highest metal concentration of 72.12% yielded the strongest metal detector reading, while Sample 2 had the lowest metal concentration of 32.14% and yielded the weakest metal detector reading.

TABLE 2

Ash content and Metal detector readings

| | Particulate Loading (%)/Type | Metal Detector Readings |
|---|---|---|
| Sample 1 | 72.12/iron oxide | 23,089 |
| Sample 2 | 32.14/iron oxide | 6691 |
| Sample 3 | 38.27/iron oxide | 8000 |
| conventional pad | 40.35/calcium carbonate | 51 |

Example 2

Figure 3:
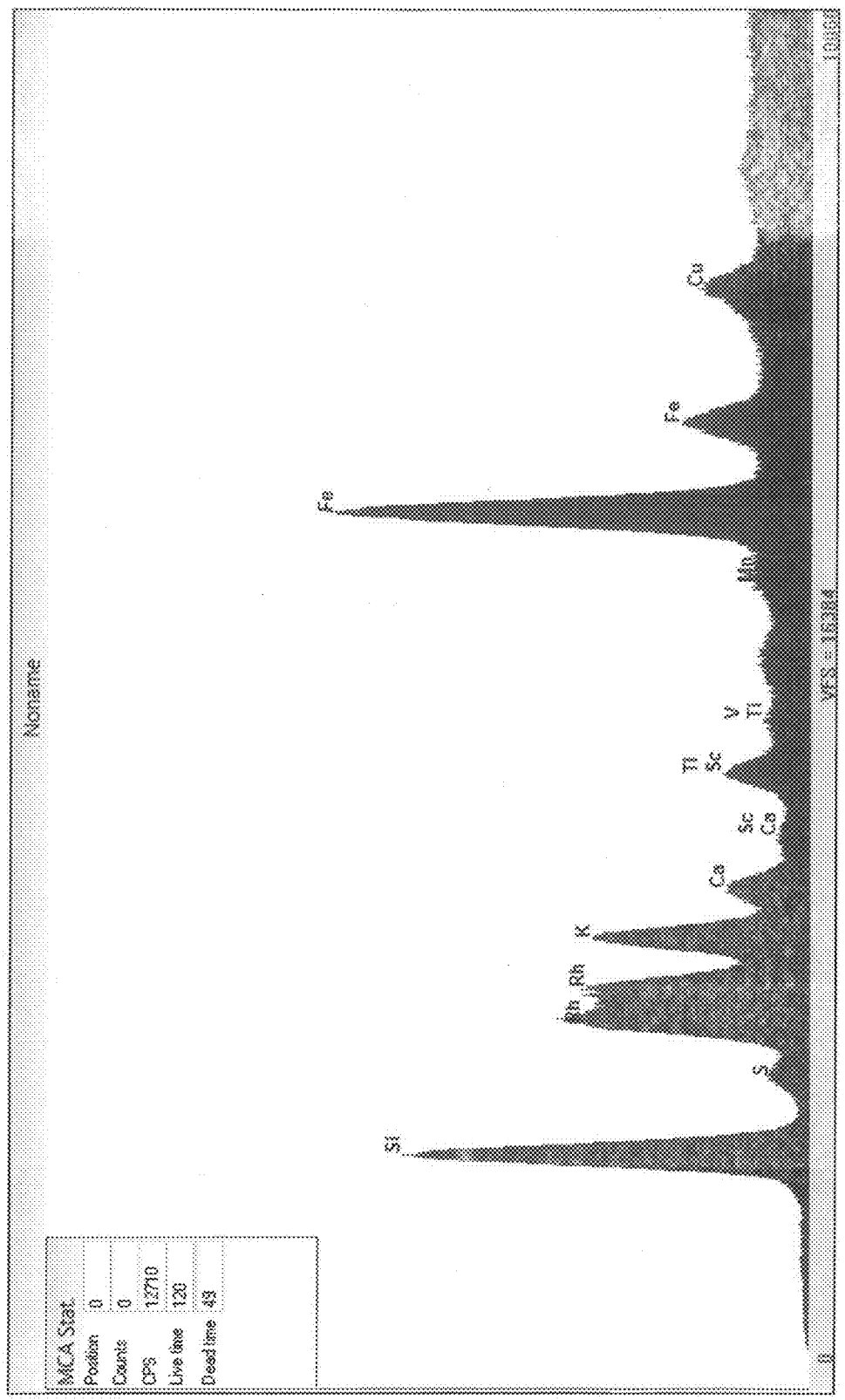
FIG. 3 is an X-ray fluorescence spectral analysis of an embodiment of the material used in the inventive detectable scouring pad.
Figure 4:
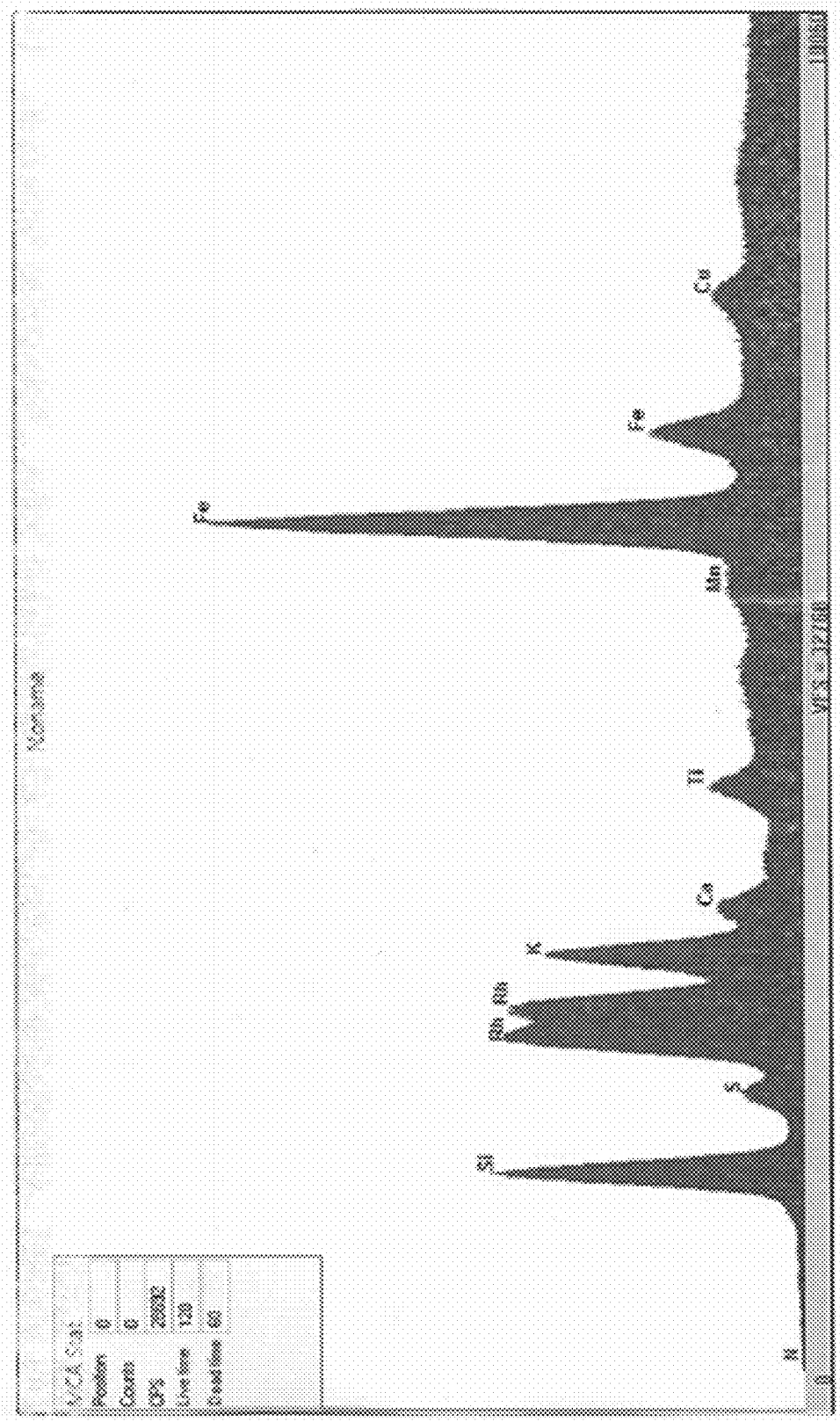
FIG. 4 is an X-ray fluorescence spectral analysis of a second embodiment of the material used in the inventive detectable scouring pad.

Spectral analysis was performed on the conventional pad (FIG. 2) and sample 2 of the inventive detectable scrub pad (FIG. 3) and sample 4 (FIG. 4) with a Xenemetrix Excalibur energy dispserive X-ray fluorescence spectrometer. As can be readily seen in FIG. 2 the conventional pad uses calcium salts such as CaCO3 as a grit. In contrast, the inventive pads use iron oxides at loading nearly double that of the convention pad to render an inventive pad detectable.

The foregoing description is illustrative of particular embodiments of the invention, but is not meant to be a limitation upon the practice thereof. The following claims, including all equivalents thereof, are intended to define the scope of the invention.

The invention claimed is:

1. A process of detecting a scouring pad comprising:
    forming a fiber comprising a polymer having a cross-section and a length as a sparse unwoven polymer from said fiber;
    overcoating said fiber with a curable thermoset resin containing particulate in an amount to render said pad spectroscopically detectable based on detection of said particulate;
    allowing said curable thermoset resin to cure to form the scouring pad;
    passing the scouring pad through an X-ray detector; and
    collecting a signal from said X-ray detector indicative of the presence of the scouring pad.

2. The process of claim 1 wherein forming said fiber includes forming a fiber comprising cellulose, nylon, or spun polypropylene.

3. The process of claim 1 further comprising preparing said overcoating by mixing said curable thermoset resin with said particulate of one of iron, bronze, brass, steel, barium salts, cobalt, titanium, tin, copper, tungsten, platinum, silver, bismuth, zinc, lead, molybdenum, neodymium, samarium, alloys of any of the aforementioned, oxides of any of the aforementioned metals, or nitrides of any of the aforementioned.

4. The process of claim 1 wherein said fiber is formed of one of polypropylene, polyethylene, polybutene, polyisobutylene, a polyamide, a polyacrylate, a polystyrene, a polyurethane, an acetal resins, a polyethylene vinyl alcohol; a polyester, a polyphenylene sulfide, a thermoplastic elastomers, a polyacrylonitrile; a cellulose, a polyaramid, or a block copolymer containing at least one of the aforementioned.

5. The process of claim 1 wherein said fiber is formed of a polymer having a single composition with the cross section that is one of circular, multi-lobal, or polygonal.

6. The process of claim 1 wherein forming said fiber to have a diameter between 0.1 and 500 microns.

7. The process of claim 1 further comprising preparing said overcoating by mixing said curable thermoset resin with said particulate wherein said particulate is present from 30 to 85% total weight of the fiber.

8. The process of claim 1 wherein overcoating said fiber with said curable thermoset resin containing particulate includes applying said overcoating to have a thickness of between 10 and 200 percent of a diameter of the polymer fibers.

9. The process of claim 1 wherein overcoating said fiber with said curable thermoset resin containing particulate includes overcoating said fiber with at least one of a poly(meth)acrylate, a polyesters, an epoxy, a polyurethane, or a polyurea.

10. The process of claim 1 further comprising bonding the scouring pad to a substrate of woven fabric.

11. The process of claim 1 further comprising bonding the scouring pad to a substrate of nonwoven fabric.

12. The process of claim 1 further comprising bonding the scouring pad to a substrate of thermoplastic film.

13. The process of claim 1 further comprising bonding the scouring pad to a substrate of a polymeric sponge.

14. The process of claim 1 wherein overcoating said fiber with said curable thermoset resin containing particulate includes overcoating said fiber with said curable thermoset resin that is water based acrylic and phenolics.

15. The process of claim 1 wherein said particulate is iron, iron oxide, or a combination thereof.

16. A process of detecting a scouring pad comprising:
   forming a fiber comprising a polymer having a cross-section and a length as a sparse unwoven polymer from said fiber;
   overcoating said fiber with a curable thermoset resin containing particulate in an amount to render said pad spectroscopically detectable based on detection of said particulate;
   allowing said curable thermoset resin to cure to form the scouring pad;
   passing the scouring pad through a magnetic detector; and
   collecting a signal from said magnetic detector indicative of the presence of the scouring pad.

17. The process of claim 16 wherein forming said fiber includes forming a fiber comprising cellulose, nylon, or spun polypropylene.

18. The process of claim 16 further comprising preparing said overcoating by mixing said curable thermoset resin with said particulate of one of iron, bronze, brass, steel, barium salts, cobalt, titanium, tin, copper, tungsten, platinum, silver, bismuth, zinc, lead, molybdenum, neodymium, samarium, alloys of any of the aforementioned, oxides of any of the aforementioned metals, or nitrides of any of the aforementioned.

19. The process of claim 16 wherein said fiber is formed of one of polypropylene, polyethylene, polybutene, polyisobutylene, a polyamide, a polyacrylate, a polystyrene, a polyurethane, an acetal resins, a polyethylene vinyl alcohol; a polyester, a polyphenylene sulfide, a thermoplastic elastomers, a polyacrylonitrile; a cellulose, a polyaramid, or a block copolymer containing at least one of the aforementioned.

20. The process of claim 16 wherein said fiber is formed of a polymer having a single composition with the cross section that is one of circular, multi-lobal, or polygonal.

21. The process of claim 16 wherein forming said fiber to have a diameter between 0.1 and 500 microns.

22. The process of claim 16 further comprising preparing said overcoating by mixing said curable thermoset resin with said particulate wherein said particulate is present from 30 to 85% total weight of the fiber.

23. The process of claim 16 wherein overcoating said fiber with said curable thermoset resin containing particulate includes applying said overcoating to have a thickness of between 10 and 200 percent of a diameter of the polymer fibers.

24. The process of claim 16 wherein overcoating said fiber with said curable thermoset resin containing particulate includes overcoating said fiber with at least one of a poly(meth)acrylate, a polyesters, an epoxy, a polyurethane, or a polyurea.

25. The process of claim 16 further comprising bonding the scouring pad to a substrate of woven fabric.

26. The process of claim 16 further comprising bonding the scouring pad to a substrate of nonwoven fabric.

27. The process of claim 16 further comprising bonding the scouring pad to a substrate of thermoplastic film.

28. The process of claim 16 further comprising bonding the scouring pad to a substrate of a polymeric sponge.

29. The process of claim 16 wherein overcoating said fiber with said curable thermoset resin containing particulate includes overcoating said fiber with said curable thermoset resin that is water based acrylic and phenolics.

30. The process of claim 16 wherein said particulate is iron, iron oxide, or a combination thereof.

\* \* \* \* \*